United States Patent
Kim et al.

(10) Patent No.: US 9,912,940 B2
(45) Date of Patent: Mar. 6, 2018

(54) STEREOSCOPIC IMAGE DISPLAY DEVICE AND METHOD FOR DRIVING THE SAME

(71) Applicant: SAMSUNG DISPLAY CO., LTD., Yongin-City, Gyeonggi-Do (KR)

(72) Inventors: Jung-Taek Kim, Yongin (KR); Bong-Hyun You, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 157 days.

(21) Appl. No.: 14/602,502

(22) Filed: Jan. 22, 2015

(65) Prior Publication Data
US 2015/0222889 A1    Aug. 6, 2015

(30) Foreign Application Priority Data
Feb. 4, 2014 (KR) .......................... 10-2014-0012498

(51) Int. Cl.
| G09G 5/00 | (2006.01) |
| G06F 3/038 | (2013.01) |
| G09G 5/10 | (2006.01) |
| H04N 13/04 | (2006.01) |
| G09G 3/14 | (2006.01) |
| G09G 3/20 | (2006.01) |
| G09G 3/00 | (2006.01) |
| G09G 3/3233 | (2016.01) |

(52) U.S. Cl.
CPC ......... *H04N 13/0497* (2013.01); *G09G 3/003* (2013.01); *G09G 3/14* (2013.01); *G09G 3/2022* (2013.01); *G09G 3/2096* (2013.01); *G09G 3/3233* (2013.01); *H04N 13/0438* (2013.01); *G09G 2300/0852* (2013.01); *G09G 2300/0861* (2013.01); *G09G 2310/061* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS 5,475,448 A * 12/1995 Saegusa ............... G09G 3/2037
                                                       345/214
8,054,247 B2   11/2011 Ryu et al.
(Continued)

FOREIGN PATENT DOCUMENTS

KR        10-0805609        2/2008

*Primary Examiner* — Kent Chang
*Assistant Examiner* — William Lu
(74) *Attorney, Agent, or Firm* — Lee & Morse, P.C.

(57) ABSTRACT

A stereoscopic image display device includes a display panel, a scan driver, and a data driver. The display panel includes pixels coupled to data lines and scan lines. The pixels do not emit light during a data pre-addressing period and pixels emit light during a data addressing period. The scan driver supplies scan signals to the scan lines. The data driver supplies data voltages to the data lines in synchronization with the scan signals. The scan driver supplies first scan signals to the scan lines during the data pre-addressing period, and supplies second scan signals to the scan lines during the data addressing period. Each of the first scan signals has one pulse, and each of the second scan signals has a plurality of pulses.

14 Claims, 7 Drawing Sheets

(56) References Cited

U.S. PATENT DOCUMENTS

| | | | |
|---|---|---|---|
| 8,373,625 B2* | 2/2013 | Kimura | G09G 3/3258 345/204 |
| 2003/0197667 A1* | 10/2003 | Numao | G09G 3/2029 345/82 |
| 2003/0214493 A1* | 11/2003 | Akimoto | G09G 3/2011 345/204 |
| 2003/0223053 A1* | 12/2003 | Liu | G01C 3/00 356/5.1 |
| 2005/0046619 A1* | 3/2005 | Senda | G09G 3/3283 345/76 |
| 2006/0050022 A1* | 3/2006 | Kang | G09G 3/2022 345/60 |
| 2007/0080901 A1* | 4/2007 | Yang | G09G 3/2029 345/63 |
| 2008/0055206 A1* | 3/2008 | Ryu | G09G 3/2022 345/76 |
| 2008/0129681 A1* | 6/2008 | Hagood | G09G 3/346 345/109 |
| 2008/0158110 A1* | 7/2008 | Iida | G09G 3/3233 345/76 |
| 2008/0218442 A1* | 9/2008 | Jeong | G09G 3/293 345/60 |
| 2008/0246701 A1* | 10/2008 | Park | G09G 3/3233 345/77 |
| 2009/0179877 A1* | 7/2009 | Akamatsu | G09G 3/2927 345/204 |
| 2010/0091207 A1* | 4/2010 | Hasegawa | H04N 13/0438 349/15 |
| 2011/0279430 A1* | 11/2011 | Koh | G09G 3/003 345/211 |
| 2012/0008054 A1* | 1/2012 | Kwon | H04N 13/0434 349/13 |
| 2012/0038609 A1* | 2/2012 | Chung | G09G 3/003 345/211 |
| 2012/0113161 A1* | 5/2012 | Hong | G09G 3/003 345/690 |
| 2012/0146999 A1* | 6/2012 | Hwang | G09G 3/003 345/419 |
| 2012/0154352 A1* | 6/2012 | Yamashita | G09G 3/3233 345/207 |
| 2012/0169678 A1* | 7/2012 | Shin | G09G 3/20 345/204 |
| 2013/0027382 A1* | 1/2013 | Kato | G09G 3/003 345/212 |
| 2013/0038642 A1* | 2/2013 | Origuchi | G09G 3/003 345/690 |
| 2013/0038645 A1* | 2/2013 | Origuchi | G09G 3/003 345/691 |
| 2014/0071028 A1* | 3/2014 | Han | G09G 3/3266 345/77 |

* cited by examiner

FIG. 5

FIG. 10
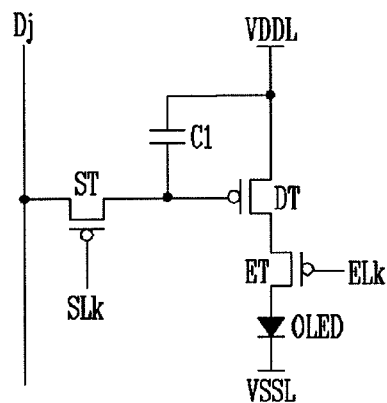
FIG. 11
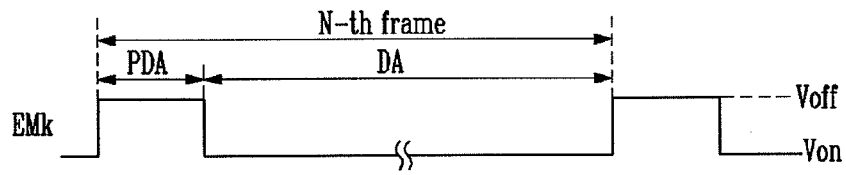
FIG. 12
| MEM1 | Nth data write | Nth data read | (N+2)th data write | (N+2)th data read |
| --- | --- | --- | --- | --- |
| MEM2 | (N-1)th data write | (N+1)th data read | (N+1)th data write | (N+3)th data read |

STEREOSCOPIC IMAGE DISPLAY DEVICE AND METHOD FOR DRIVING THE SAME

CROSS-REFERENCE TO RELATED APPLICATION

Korean Patent Application No. 10-2014-0012498, filed on Feb. 4, 2014, and entitled, "Stereoscopic Image Display Device and Method for Driving the Same," is incorporated by reference herein in its entirety.

BACKGROUND

1. Field

One or more embodiments described herein relate to a stereoscopic imaging display device and method for driving the same.

2. Description of the Related Art

A stereoscopic image display generates a three-dimensional ("3D") image using a stereoscopic technique or an auto-stereoscopic technique. The stereoscopic technique uses parallax images with a high stereoscopic effect. For example, parallax images may include a left eye image and a right eye image.

Stereoscopic techniques may be classified into a glasses-type method and a non-glasses type method. The glasses-type method may include a patterned retarder method and a shutter glasses method. The patterned retarder method changes polarization directions of left and right eye images, to display the left and right eye images on a direct-view-type display device or projector, and implements a stereoscopic image using polarization glasses. The shutter glasses method displays the left and right eye images on a direct-view-type display device or a projector in a time-division manner, in order to implement a stereoscopic image using liquid crystal shutter glasses.

The non-glasses type method separates parallax images on a direct-view-type display device or projector using an optical plate, such as a parallax barrier and a lenticular lens. A direct-view type display may refer to a display device displaying light emitted from a light source. The direct-view type display may be implemented as one of a liquid crystal display, plasma display panel, or organic light emitting diode display.

SUMMARY

In accordance with one embodiment, a stereoscopic image display device includes a display panel including a plurality of pixels coupled to data lines and scan lines, wherein the pixels do not emit light during a data pre-addressing period and the pixels emit light during a data addressing period; a scan driver configured to supply scan signals to the scan lines; and a data driver configured to supply data voltages to the data lines in synchronization with the scan signals, wherein the scan driver is configured to supply first scan signals of the scan signals to the scan lines during the data pre-addressing period, and is configured to supply second scan signals of the scan signals to the scan lines during the data addressing period, and wherein each of the first scan signals has one pulse and each of the second scan signals has a plurality of pulses.

The data voltages to be supplied to the plurality of pixels during the data pre-addressing period may be same as data voltages to be lastly supplied to the plurality of pixels during the data addressing period.

The scan driver may supply pulses of the second scan signals to the scan lines according to a non-sequential order during the data addressing period. The may supply pulses of the first scan signals to the scan lines according to a non-sequential order during the data pre-addressing period.

At least one pixel of the plurality of pixels may include a driving transistor configured to turn on or off according to a voltage supplied to a gate electrode of the driving transistor; a scan transistor configured to turn on to supply a data voltage to the gate electrode of the driving transistor in response to scan pulses of the scan signals; an organic light emitting diode configured to emit light when the driving transistor is turned on; and a first capacitor coupled between the gate electrode of the driving transistor and a first power voltage line to which a first power voltage is supplied.

The driving transistor may turn on when a first data voltage is supplied to the gate electrode of the driving transistor, and the driving transistor may turn off when a second data voltage lower than the first data voltage is supplied to the gate electrode of the driving transistor. A second power voltage may be supplied to a second power voltage line coupled to a cathode of the organic light emitting diode, the second power voltage may have a first level voltage during the data pre-addressing period and a second level voltage lower than the first level voltage during the data addressing period.

The display panel may include emission lines parallel to scan lines, the at least one pixel may include an emission transistor configured to turn on to connect the gate electrode of the driving transistor with the scan transistor in response to one or more emission signals supplied to the emission lines.

The emission signal may be supplied as a gate on voltage during a first period of the data pre-addressing period and the data addressing period and may be supplied a gate off voltage during a second period of the data pre-addressing period, the emission transistor may be configured to be turned on when the emission signal having the gate on voltage is supplied and turned off when the emission signal having the gate off voltage is supplied.

The display panel may include emission lines parallel to scan lines, the at least one pixel may include an emission transistor configured to turn on to connect the driving transistor with the organic light emitting diode in response to one or more emission signals supplied to the emission lines.

The emission signal may be supplied as a gate on voltage during the data addressing period and a gate off voltage during the data pre-addressing period, and the emission transistor may be configured to be turned on when the emission signal having the gate on voltage is supplied and turned off when the emission signal having the gate off voltage is supplied. The scan driver may be configured to supply pulses of the first scan signals to the scan lines according to a sequential order during the data pre-addressing period.

At least one pixel of the plurality of pixels may include a driving transistor configured to turn on or turn off according to a voltage supplied to a gate electrode of the driving transistor; a scan transistor configured to turn on to supply a data voltage to the gate electrode of the driving transistor in response to the scan signals; an organic light emitting diode configured to emit light in accordance with the drain-source current of the driving transistor; and a storage capacitor coupled between the gate electrode of the driving transistor and a first power voltage line to which a first power voltage is supplied.

The driving transistor may turn on when a first data voltage is supplied to the gate electrode of the driving transistor and may turn off when a second data voltage lower than the first data voltage is supplied to the gate electrode of the driving transistor. A second power voltage may be supplied to a second power voltage line coupled to a cathode of the organic light emitting diode, the second power voltage may have a first level voltage during the data pre-addressing period and a second level voltage lower than the first level voltage during the data addressing period.

The display panel may include emission lines parallel to scan lines, the at least one pixel may include an emission transistor configured to turn on to connect the gate electrode of the driving transistor with the scan transistor in response to emission signals supplied to the emission lines.

The emission signal may be supplied as a gate on voltage during a first period of the data pre-addressing period and the data addressing period and may be supplied as a gate off voltage during a second period of the data pre-addressing period, and the emission transistor may turn on when the emission signal having the gate on voltage is supplied and turn off when the emission signal having the gate off voltage is supplied.

The display panel may include emission lines parallel to scan lines, the at least one pixel may include an emission transistor configured to turn on to connect the driving transistor with the organic light emitting diode in response to one or more emission signals supplied to the emission lines.

The emission signal may be supplied as a gate on voltage during the data addressing period and a gate off voltage during the data pre-addressing period, the emission transistor may turn on when the emission signal having the gate on voltage is supplied and turn off when the emission signal having the gate off voltage is supplied.

In accordance with one embodiment, a method is provided for driving a stereoscopic image display device, including a display panel having a plurality of pixels coupled to data lines and scan lines, the pixels not to emit light during a data pre-addressing period and the pixels to emit light during a data addressing period. The method includes supplying scan signals to the scan lines; and supplying data voltages to the data lines in synchronization with the scan signals, wherein supplying the scan signals includes: supplying first scan signals of the scan signals to the scan lines during the data pre-addressing period; and supplying second scan signals to the scan lines during the data addressing period, wherein each of the first scan signals has one pulse and each of the second scan signals has a plurality of scan pulses.

In accordance with another embodiment, a controller for a stereoscopic image display device includes a scan driver to supply scan signals to the scan lines; and a data driver to supply data voltages to the data lines in synchronization with the scan signals, wherein the scan driver is to supply first scan signals to the scan lines during a data pre-addressing period and second scan signals to the scan lines during a data addressing period, wherein pixels do not emit light during a data pre-addressing period and pixels emit light during a data addressing period, and wherein each of the first scan signals has one pulse and each of the second scan signals has a plurality of pulses.

BRIEF DESCRIPTION OF THE DRAWINGS

Features will become apparent to those of skill in the art by describing in detail exemplary embodiments with reference to the attached drawings in which:

FIG. 5 illustrates scan signals supplied to scan lines during a N-th frame period;

FIG. 10 illustrates another embodiment of a pixel;

FIG. 11 is a waveform diagram illustrating a k-th emission signal supplied to an emission line during a N-th frame period, according to another embodiment; and FIG. 12 illustrates an embodiment of a timing controller including memories.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
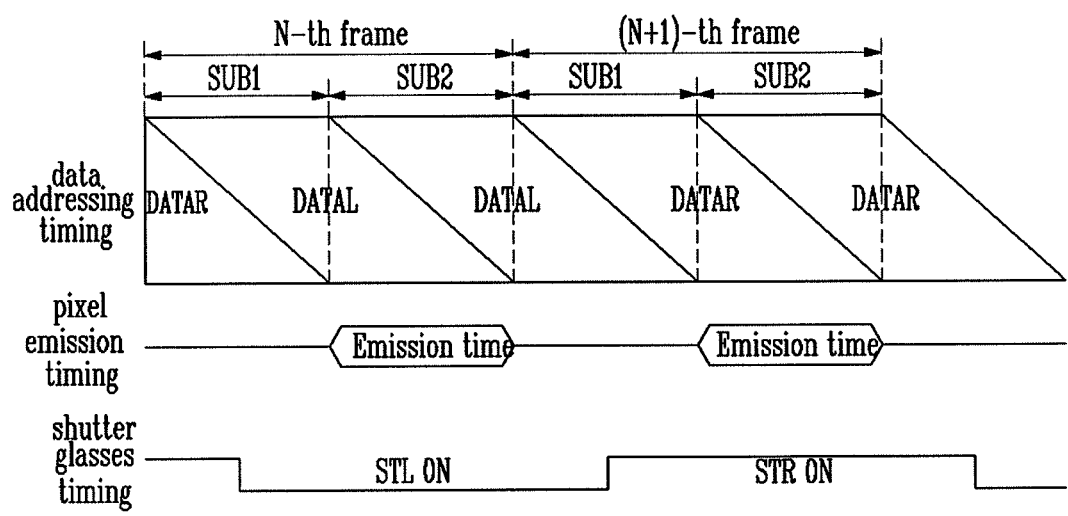
FIG. 1 illustrates driving timings of a related art stereoscopic image display device driven using a shutter glasses method.

FIG. 1 illustrates driving timings of a related art stereoscopic image display device driven by a shutter glasses method. Referring to FIG. 1, the related art stereoscopic image display device is driven by separating one frame period into at least two sub frame periods SUB1, SUB2. For example, the related art stereoscopic image display device may display left eye images during first and second sub frame periods SUB1, SUB2 of N-th (N is a positive integer) frame period, and right eye images during first and second sub frame periods SUB1, SUB2 of (N+1)-th frame period.

Therefore, the related art stereoscopic image display device may address left eye image data DATAL during first and second sub frame periods SUB1, SUB2 of the N-th frame period, and may address right eye image data DATAR during first and second sub frame periods SUB1, SUB2 of the (N+1)-th frame period.

Also, pixels of the related art stereoscopic image display device may emit light only during the second sub frame SUB2 of the N-th and (N+1)-th frame periods. Also, a left shutter of shutter glasses may open during the second sub frame SUB2 of the N-th frame period, and a right shutter may open during the second sub frame SUB2 of the (N+1)-th frame period. Therefore, a user may watch the left eye images during a left shutter open period and the right eye images during a right shutter open period. In this way, the related art stereoscopic image display device attempts to prevent 3D crosstalk. However, the user may still perceive 3D crosstalk when the user sees the left and right eye images at the same time.

The related art stereoscopic image display device may be driven at a high frame frequency, e.g., 240 Hz. Thus, a period in which data voltages are supplied to the pixels of the related art stereoscopic image display device may decrease. However, in this case, if the related art stereoscopic image display device is implemented as an organic light emitting diode driven by a digital driving method, grayscale representation is lowered as described with reference to FIG. 2. Grayscale representation may refer to how many gray scale values can be represented.

Figure 2:
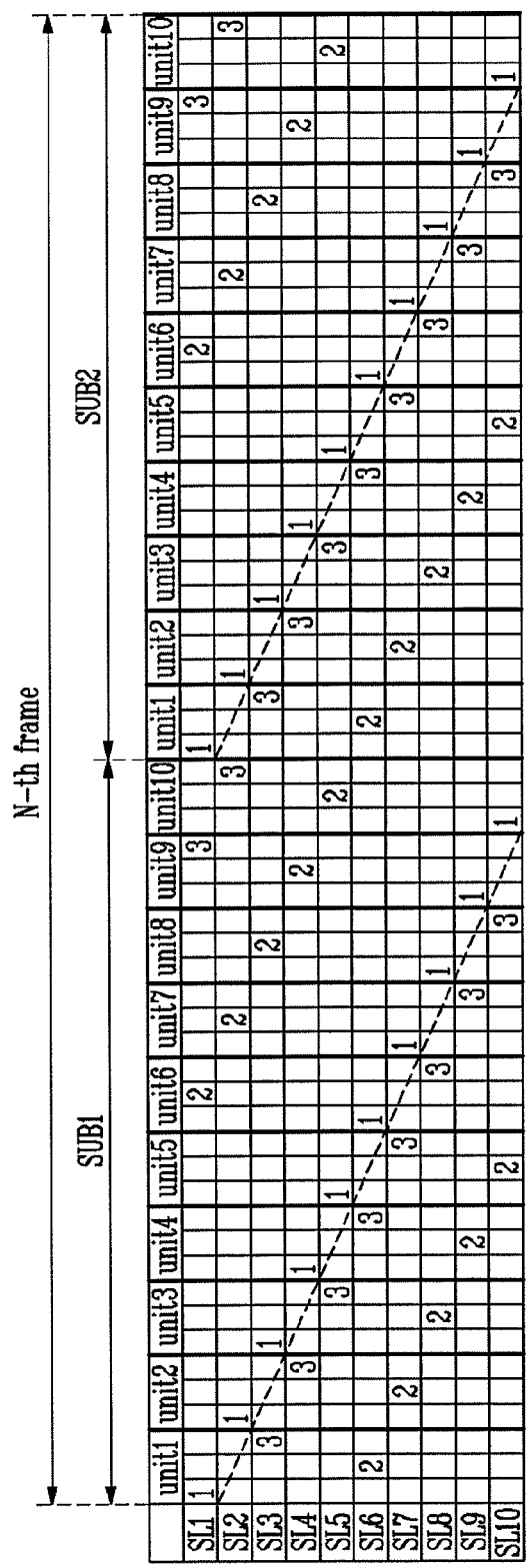
FIG. 2 illustrates scan signals supplied to scan lines of a related art stereoscopic image display device.

FIG. 2 illustrates scan signals supplied to scan lines of the related art stereoscopic image display device driven by a digital driving method. In FIG. 2, the scan signals supplied to the scan lines are illustrated during the N-th frame period of FIG. 1. The scan signals supplied to the scan lines during the (N+1)-th frame period are substantially same as the scan signals supplied to the scan lines during the N-th frame period. Furthermore, in FIG. 2, only first to tenth scan lines supplied to first to tenth scan lines S1 to S10 are shown for purposes of convenience.

Referring to FIG. 2, each of the first and second sub frames SUB1, SUB2 of the N-th frame period may be separated into unit periods of unit1 to unit10. The number of unit periods unit1 to unit10 is same as the number of scan lines SL1 to SL10. Therefore, if first to tenth scan lines SL1 to SL10 are formed in a display panel, the first and second sub frames SUB1, SUB2 of the N-th frame period may be separated into ten unit periods unit1 to unit10 as shown in FIG. 2.

The number of scan signals supplied to scan lines during each unit period is same as the number of subfields. Also, the number of pulses of each scan signal is the same as the number of subfields. The subfields are different from each other. Three subfields are shown in FIG. 2, a first sub field is from 1 to 2, a second subfield is from 2 to 3, and a third subfield is from 3 to 1.

Therefore, the related art stereoscopic image display device may represent gray scale values based on the number of subfields. For example, if the number of subfields is u (u is a positive integer), the related art stereoscopic image display device may represent $2^u$ gray scale values.

Because the related art stereoscopic image display device is driven at a high frame frequency, e.g., 240 Hz, each of the first and second sub frame periods SUB1, SUB2 is approximately 4.167 ms. If the related art stereoscopic image display device has a FHD (full high definition, 1920×1080) resolution, each of the first and second sub frame periods is separated into 1080 unit periods. Thus, each of the 1080 unit periods is approximately 3.85 μs. If the number of subfields is u, u scan signals are supplied during each of the 1080 unit periods.

If u is more than 4, a data voltage supplying period may be less than 1 μs. Thus, a proper data voltage may not be supplied to each pixel because the data voltage supplying period is too short.

Finally, if the related art stereoscopic image display device has a FHD resolution, the number of subfields may be a maximum of three. In this case, the related art stereoscopic image display device may represent eight gray scale values. Therefore, grayscale representation is remarkably lowered.

Figure 3:
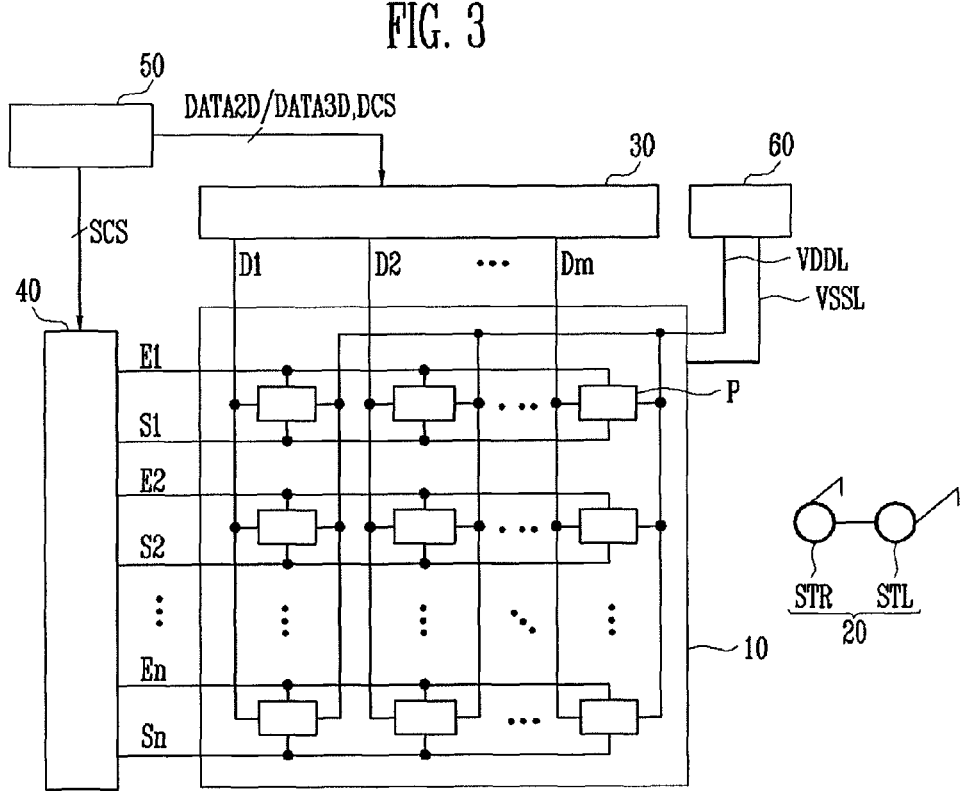
FIG. 3 illustrates an embodiment of a stereoscopic image display device.

FIG. 3 illustrates an embodiment of a stereoscopic image display device implemented with a flat panel display such as a liquid crystal display, a field emission display, a plasma display panel, or an organic light emitting diode (OLED) display. For illustrative purposes, a stereoscopic image display device will be discussed for an OLED display. Also, the display device according to this embodiment may be driven in a shutter glass method, or a different method.

Referring to FIG. 3, the stereoscopic image display device includes a display panel 10, shutter glasses 20, a data driver 30, a scan driver 40, a timing controller 50, and a power supply source 60. Data lines D1 to Dm (m is a natural number of 2 or more) and scan lines S1 to Sn (n is a natural number of 2 or more) are formed to intersect each other in display panel 10. Emission lines E1 to En are formed parallel to scan lines S1 to Sn. Pixels P area disposed in a matrix form in cell areas defined by the data lines D1 to Dm and scan lines S1 to Sn formed in display panel 10. Each pixel P is coupled to a data line and a scan line through a scan transistor, and is coupled to an emission line through an emission transistor.

The shutter glasses 20 may be liquid crystal shutter glasses. In this case, each of a left shutter STL and a right shutter STR of the shutter glasses 20 may include a first transparent plate, a first transparent electrode on the first transparent plate, a second transparent plate, a second transparent electrode on the second transparent plate, and a liquid crystal layer between the first and second transparent electrodes.

If a reference voltage is supplied to one of the first and second transparent electrodes, a shutter on voltage or a shutter off voltage may be supplied to the other of the first and second transparent electrodes. For example, if a reference voltage is supplied to the first transparent electrode, a shutter on voltage or a shutter off voltage is supplied to the second transparent electrode. In this case, each of the left shutter STL and the right shutter STR may pass light from display panel 10 when the shutter on voltage is supplied to the second transparent electrode. Also, each of the left shutter STL and the right shutter STR may block light from display panel 10 when the shutter off voltage is supplied to the second transparent electrode.

Each of the left shutter STL and right shutter STR may open or close based on a shutter glasses control signal Cst from timing controller 50. Opening timings of each of the left shutter STL and right shutter STR are described in detail with reference to FIGS. 4 and 5.

The data driver 30 includes at least one source drive integrated circuit (IC). The source drive IC receives 2D digital video data DATA2D from timing controller 50 in a 2D mode, and receives 3D digital video data DATA3D from timing controller 50 in a 3D mode. Also, the source drive IC receives from the timing controller 50.

The source drive IC supplies data voltages to the data lines D1 to Dm. More specifically, the source drive IC may supply data voltages to the data lines D1 to Dm based on the 2D digital video data DATA2D and the data timing control signal DCS in the 2D mode. Also, the source drive IC may supply data voltages to the data lines D1 to Dm based on the 3D digital video data DATA3D and the data timing control signal DCS in the 3D mode. Source drive IC may supply data voltages to the data lines D1 to Dm based on the left eye image data DATAL and the data timing control signal DCS during a N-th frame period. Source drive IC may supply data voltages to the data lines D1 to Dm based on the right eye image data DATAR and the data timing control signal DCS during a (N+1)-th frame period. A data voltage may be one of a first data voltage for emitting light from a pixel P or a second data voltage for not emitting light from the pixel P.

The scan driver 40 includes a scan signal output unit and an emission signal output unit. Each of the scan signal output unit and the emission signal output unit receives a scan timing control signal SCS from timing controller 50.

Figure 4:
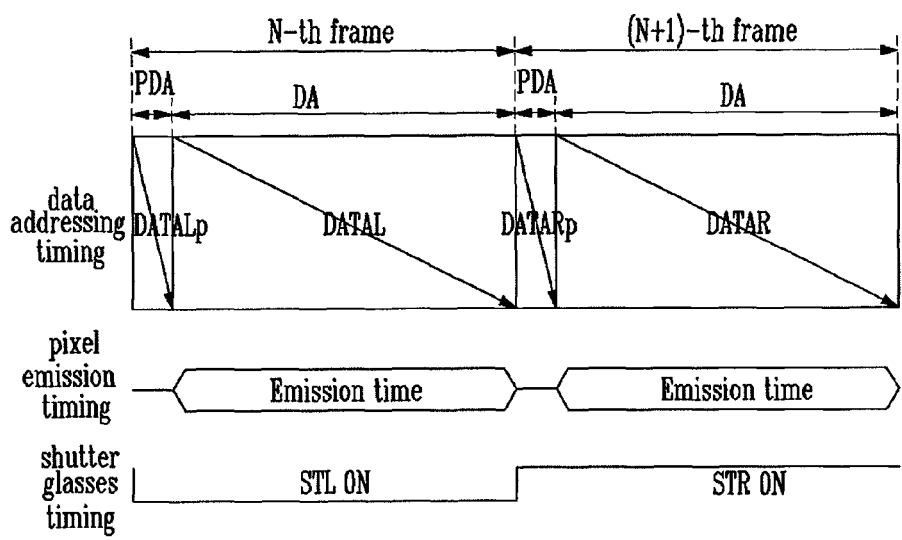
FIG. 4 illustrates driving timings of the stereoscopic image display device.

The scan signal output unit may supply scan signals to the scan lines S1 to Sn of display panel 10 based on scan timing control signal SCS. The scan signal output unit may separate one frame period into a data pre-addressing period PDA and a data addressing period DA as shown in FIG. 4. The data addressing period DA includes p (p is a positive integer greater than 1) unit periods. The scan signal output unit may supply first scan signals to the scan lines S1 to Sn during the data pre-addressing period PDA. The scan signal output unit may supply second scan signals to the scan lines S1 to Sn during the data addressing period DA. Each of the first scan signals includes one pulse and each of the second scan signals may include a plurality of pulses.

The emission signal output unit may supply emission signals to emission lines E1 to En of display panel 10 based on scan timing control signal SCS. The emission signals supplied from the emission signal output unit are described in detail with reference to FIG. 10.

The timing controller 50 receives digital image data DATA2D/DATA3D, timing signals, and a mode signal MODE from a host system. The timing controller 50 receives the 2D digital image data DATA2D in the 2D mode, and the 3D digital image data DATA3D in the 3D mode. The 3D image data DATA3D may include the left eye image data DATAL and the right eye image data DATAR. The timing signals may include a vertical sync signal, a horizontal sync signal, a data enable signal, and/or a dot clock. The mode signal MODE is a signal capable of distinguishing 2D mode from 3D mode.

The timing controller 50 may generate the scan timing control signal SCS for controlling the operation timing of scan driver 40 and the data timing control signal DCS for controlling the operation timing of data driver 30, based on the timing signals. The timing controller 50 may supply the scan timing control signal SCS to scan driver 40. The timing controller 140 may supply the digital image data DATA2D/DATA3D and the data timing control signal DCS to data driver 30.

Also, timing controller 50 may generate shutter glasses control signal Cst based on the timing signals. The timing controller 50 may supply the shutter glasses control signal Cst to shutter glasses 20.

In one embodiment, the timing controller 50 may be driven at a 120 Hz frame frequency. In this case, the timing controller 50 may supply the left eye image data DATAL to data driver 30 during the N-th frame period, and the right eye image data DATAR to data driver 30 during the (N+1)-th frame period in 3D mode. Also, the timing controller 50 may separate one frame period into the data pre-addressing period PDA and the data addressing period DA in 3D mode.

The power supply source 60 may supply a first power voltage to a first power voltage line VDDL and a second power voltage to a second power voltage line VSSL. The first power voltage may be higher than the second power voltage.

FIG. 4 illustrates driving timings of a stereoscopic image display device according to one embodiment. In FIG. 4, the N-th frame period refers to a period in which the left eye image data are supplied, and the (N+1)-th frame period refers to a period in which the right eye image data are supplied. In another embodiment, the N-th frame period may be a period in which the right eye image data are supplied, and the (N+1)-th frame period may be a period in which the right eye image data are supplied.

Referring to FIG. 4, one frame period includes a data pre-addressing period PDA and data addressing period DA. The pixels P of the display panel 10 may not emit light during the data pre-addressing period PDA, and may emit light during the data addressing period DA. The data addressing period DA includes p unit periods. Here, p may be the number of scan lines S1 to Sm. Also, if the number of the subfields is u, each of the second scan signals includes u pulses.

First, pixels P of the display panel 10, the data driver 30, the scan driver 40, and the timing controller 50 during the data pre-addressing period PDA of the N-th frame period are described herein.

The timing controller 50 may generate pre left eye image data DATALp based on the left eye image data DATAL, and may supply the pre left eye image data DATALp and data timing control signal DCS to the data driver 30 during the data pre-addressing period PDA of the N-th frame period. Also, the timing controller 50 may supply scan timing control signal SCS to the scan driver 40 during the data pre-addressing period PDA of the N-th frame period.

The scan driver 40 supplies the first scan signals to the scan lines S1 to Sn based on the scan timing control signal SCS during the data pre-addressing period PDA of the N-th frame period. Each first scan signal has one pulse. The scan driver 40 may supply pulses of the first scan signals to the scan lines according to a sequential order during the data pre-addressing period PDA of the N-th frame period, as shown in FIG. 4. The sequential order may be a forward direction order or a backward direction order. The forward direction order may refer to a direction from the first scan line S1 to n-th scan line Sn. The backward direction order may refer to a direction from the n-th scan line Sn to the first scan line S1. Alternatively, the scan driver 40 may supply pulses of the first scan signals to the scan lines according to a non-sequential order during the data pre-addressing period PDA of the N-th frame period.

The data driver 30 may generate pre left data voltages based on the pre left eye image data DATALp and may supply the pre left data voltages to data lines D1 to Dm based on the data timing control signal DCS during the data pre-addressing period PDA of the N-th frame period. The data driver 30 may supply the pre left data voltages synchronized with each of the pulses of the first scan signals. Therefore, the pre left data voltages are supplied to pixels P of the display panel during the data pre-addressing period PDA of the N-th frame period.

The timing controller 50 may supply the left eye image data DATAL and the data timing control signal DCS to the data driver 30 during the data addressing period DA of the N-th frame period. Also, the timing controller 50 may supply the scan timing control signal SCS to scan driver 40 during the data addressing period DA of the N-th frame period.

Figure 5:
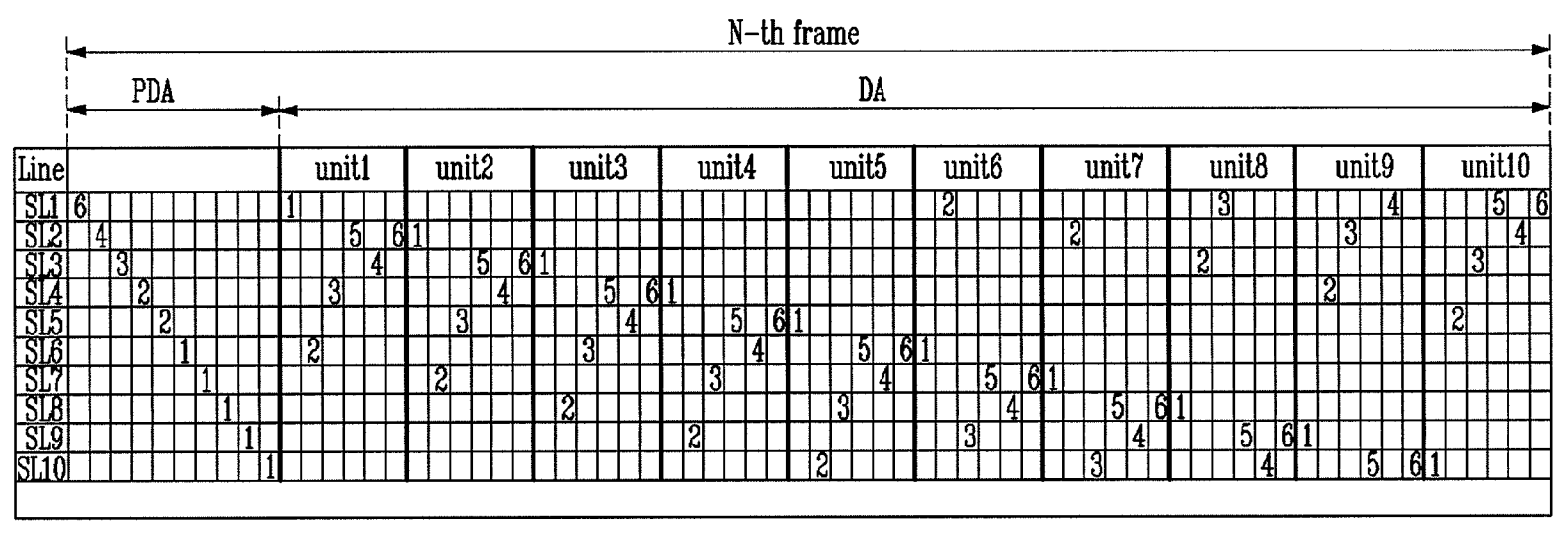

The scan driver 40 supplies the second scan signals to the scan lines S1 to Sn based on the scan timing control signal SCS during the data addressing period DA of the N-th frame period. Each second scan signal has a plurality of pulses. The number of pulses may be u. The scan driver 40 may supply pulses of the second scan signals to the scan lines S1 to Sn during the data addressing period DA of the N-th frame period, as shown in FIG. 5.

The data driver 30 may generate left data voltages based on the left eye image data DATAL, and may supply the left data voltages to the data lines D1 to Dm based on the data timing control signal DCS during the data addressing period DA of the N-th frame period. The data driver 30 may supply the left data voltages synchronized with each of the pulses of the second scan signals. Therefore, the left data voltages are supplied to the pixels P of the display panel during the data addressing period DA of the N-th frame period.

The timing controller 50 may supply the shutter glasses control signal Cst having a first logic level to the shutter glasses 20. The left shutter STL of the shutter glasses 20 is opened and the right shutter STR of the shutter glasses 20 is closed when the shutter glasses control signal CST having the first logic level is input.

As previously described, the embodiments may supply pre left data voltages to pixels P during the pre-data addressing period PDA and may supply left data voltages to pixels P during the data addressing period DA of the N-th frame period. Therefore, the embodiments may display left image and open the left shutter STL during the N-th frame period. Accordingly, the embodiments may prevent 3D crosstalk because a user may watch only the left image during the N-th frame period.

The timing controller 50 may generate pre right eye image data DATARp based on the right eye image data DATAR, and may supply the pre right eye image data DATARp and the data timing control signal DCS to data driver 30 during the data pre-addressing period PDA of the (N+1)-th frame period. Also, the timing controller 50 may supply scan timing control signal SCS to the scan driver 40 during the data pre-addressing period PDA of the (N+1)-th frame period.

The scan driver 40 supplies the first scan signals to the scan lines S1 to Sn based on the scan timing control signal SCS during the data pre-addressing period PDA of the (N+1)-th frame period. Each first scan signal has one pulse. The scan driver 40 may supply pulses of the first scan signals to the scan lines according to a sequential order during the data pre-addressing period PDA of the (N+1)-th frame period, as shown in FIG. 4. The sequential order may be a forward direction order or a backward direction order. Alternatively, the scan driver 40 may supply pulses of the first scan signals to the scan lines according to a non-sequential order during the data pre-addressing period PDA of the (N+1)-th frame period.

The data driver 30 may generate pre right data voltages based on the pre right eye image data DATARp, and may supply the pre right data voltages to the data lines D1 to Dm based on the data timing control signal DCS during the data pre-addressing period PDA of the (N+1)-th frame period. The data driver 30 may supply the pre right data voltages synchronized with each of the pulses of the first scan signals. Therefore, the pre right data voltages are supplied to the pixels P of the display panel during the data pre-addressing period PDA of the (N+1)-th frame period.

The timing controller 50 may supply the right eye image data DATAR and the data timing control signal DCS to the data driver 30 during the data addressing period DA of the (N+1)-th frame period. Also, the timing controller 50 may supply the scan timing control signal SCS to the scan driver 40 during the data addressing period DA of the (N+1)-th frame period.

The scan driver 40 supplies the second scan signals to scan lines S1 to Sn based on the scan timing control signal SCS during the data addressing period DA of the (N+1)-th frame period. Each second scan signal has a plurality of pulses. The number of pulses may be u. The scan driver 40 may supply pulses of the second scan signals to scan lines S1 to Sn during the data addressing period DA of the (N+1)-th frame period, as shown in FIG. 5.

The data driver 30 may generate right data voltages based on the right eye image data DATAR, and MAY supply the right data voltages to data lines D1 to Dm based on the data timing control signal DCS during the data addressing period DA of the (N+1)-th frame period. The data driver 30 may supply the right data voltages synchronized with each of the pulses of the second scan signals. Therefore, the right data voltages are supplied to the pixels P of the display panel during the data addressing period DA of the (N+1)-th frame period.

The timing controller 50 may supply the shutter glasses control signal Cst having a second logic level to the shutter glasses 20. The right shutter STR of the shutter glasses 20 is opened and the left shutter STL of the shutter glasses 20 is closed when shutter glasses control signal CST has the second logic level is input.

As previously described, one or more embodiments may supply pre right data voltages to pixels P during the pre-data addressing period PDA and may supply right data voltages to the pixels P during the data addressing period DA of the N-th frame period. Therefore, the right image may be displayed and the right shutter STR opened during the (N+1)-th frame period. Accordingly, the embodiments may prevent 3D crosstalk because a user may watch only right image during the (N+1)-th frame period.

Also, the embodiments may increase a data voltage supply period in which a data voltage is supplied to a pixel P because the data pre-addressing period PDA is shorter than the data addressing period DA. Therefore, one or more of the embodiments described herein may increase grayscale representation.

FIG. 5 illustrates scan signals supplied to scan lines during a N-th frame period according to one embodiment. In FIG. 5, the scan signals supplied to the scan lines are illustrated during the N-th frame period of FIG. 4. The scan signals supplied to the scan lines during the (N+1)-th frame period may be substantially same as the scan signals supplied to the scan lines during the N-th frame period. Thus, the scan signals supplied to scan lines during the (N+1)-th frame period have been omitted. Furthermore, in FIG. 5, only first to tenth scan lines supplied to the first to tenth scan lines S1 to S10 are shown for convenience.

Referring to FIG. 5, the N-th frame period is separated into a data pre-addressing period PDA and a data addressing period DA. The scan driver 40 may supply the first scan signals to first to tenth scan lines S1 to S10 during the data pre-addressing period PDA. The pulses of first scan signals may be supplied according to a forward direction order, as shown in FIG. 5. In another embodiment, the pulses of first scan signals may be supplied according to a backward direction order or in non-sequential order.

The pre left data voltages supplied to the pixels P of the display panel 10 during the data pre-addressing period PDA may be the same as left data voltages lastly supplied to pixels P of the display panel during the data addressing period DA of the N-th frame period. For example, pre left data voltages supplied to the pixels P coupled to the first, second, third, fifth, and tenth scan lines are same as left data voltages lastly supplied during tenth unit period unit 10. Also, pre left data voltages supplied to the pixels P coupled to the fourth and ninth scan lines are same as left data voltages lastly supplied during the ninth unit period unit 9.

Also, pre left data voltages supplied to the pixels P coupled to the sixth scan line are same as left data voltages lastly supplied during sixth unit period unit 6. Also, pre left data voltages supplied to the pixels P coupled to seventh scan line are same as left data voltages lastly supplied during the seventh unit period unit 7. Also, the pre left data voltages supplied to the pixels P coupled to the eighth scan line are same as the left data voltages lastly supplied during the eighth unit period unit8.

The embodiments only supply the pre left data voltages to the pixels P during the data pre-addressing period PDA, which are the same as left data voltages lastly supplied to the pixels P during the data addressing period DA. Therefore, the data pre-addressing period of the embodiments may be controlled to be shorter than the first sub frame period SUB1. Accordingly, the embodiments may increase a data voltage supply period in which a data voltage is supplied to a pixel P, to thereby increase grayscale representation.

Each second scan signal has a plurality of pulses, and the plurality of pulses may correspond to the number of subfields. The pulses of the second scan signals may have a gate on voltage which turns on scan transistors of the pixels P. For example, if the number of the subfields is six, as shown in FIG. 5, each second scan signal has six pulses. Six subfields are separated into first to sixth subfields.

At each scan line, the first subfield is a period from a first pulse 1 to a second pulse 2, the second subfield is a period from the second pulse 2 to a third pulse 3, the third subfield is a period from the third pulse 3 to a fourth pulse 4, the fourth subfield is a period from the fourth pulse 4 to a fifth pulse 5, the fifth subfield is a period from fifth pulse 5 to a sixth pulse, and the sixth subfield is a period from sixth pulse 6 to the first pulse 1.

U left data voltages are supplied to each pixel P during the data addressing period DA. Thus, each pixel is controlled to emit light or not every u subfield. The left data voltages may be a first voltage or a second voltage. The first voltage is a voltage for emitting light from a pixel, and the second voltage is a voltage for not emitting light from a pixel.

A pixel P may represent gray scale values according to which subfield the pixel P emits. If the number of the subfields is u, the pixel P may represent $2^u$ gray scale values. For example, if the number of the subfields is six as shown in FIG. 5, pixel P may represent $2^6$ gray scale values.

In FIG. 5, pixel P represents $2^5$ gray scale values when pixel P emits light during the first subfield. Pixel P represents $2^4$ gray scale values when pixel P emits light during the second subfield. Pixel P represents $2^3$ gray scale values when pixel P emits light during the third subfield. Pixel P represents $2^2$ gray scale values when pixel P emits light during the fourth subfield. Pixel P represents 2 gray scale values when pixel P emits light during the fifth subfield. Pixel P represents 1 gray scale value when pixel P emits light during the sixth subfield. For example, pixel P represents $(2^5+2^3+2^1=)$ 41 gray scale values when pixel P emits light during the first, third, and sixth subfields.

The embodiments control the supply of the second scan signals to scan lines S1 to Sn, where each scan signal has a plurality of pulses. Therefore, the embodiments may be driven in PESS (Progressive Emission with Simultaneously Scan) method, which is a digital driving method.

Figure 6:
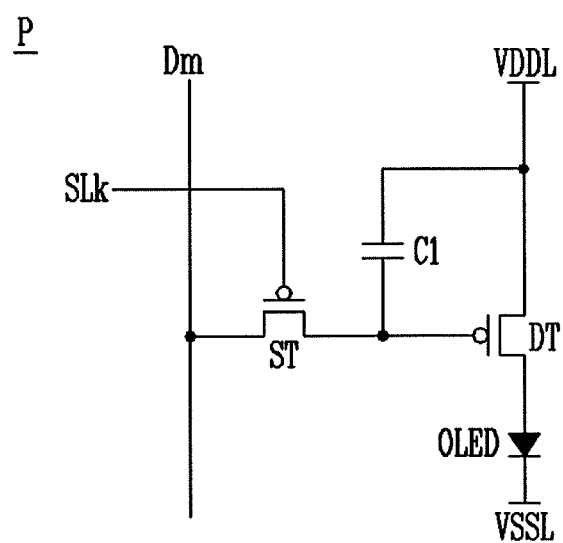
FIG. 6 illustrates an embodiment of a pixel.

FIG. 6 illustrates a pixel P according to a first embodiment. This pixel P includes a driving transistor DT, a scan transistor ST, an organic light emitting diode (OLED), and a first capacitor C1. The pixel P is coupled to a k-th (k is a positive integer equal to or greater than 1 and equal to or smaller than n) scan line Sk and a j-th (j is a positive integer equal to or greater than 1 and equal to or smaller than m) data line Dj.

The driving transistor DT includes a gate electrode, a first electrode, and a second electrode. If the first electrode is a source electrode, the second electrode may be a drain electrode. Alternatively, if the first electrode is a drain electrode, the second electrode may be a source electrode. The gate electrode of the driving transistor DT may be coupled to a second electrode of the scan transistor ST. The first electrode of the driving transistor DT may be coupled to a first power voltage line VDDL for supplying a first power voltage. The second electrode of the driving transistor DT may be coupled to an anode of the OLED.

The driving transistor DT may be turned on or turned off according to a voltage supplied to the gate electrode. A data voltage supplied to the gate electrode of the driving transistor may have a first voltage or a second voltage. The first voltage is a voltage for turning on the driving transistor DT. Thus, the OLED may emit light when the first voltage is supplied to the gate electrode of the driving transistor DT. The second voltage is a voltage for tuning off the driving transistor DT. Thus, the OLED may not emit light when the second voltage is supplied to the gate electrode of the driving transistor DT.

The anode of the OLED may be coupled to the second electrode of the driving transistor DT. A cathode of the OLED may be coupled to a second power voltage line VSSL for supplying a second power voltage lower than the first power voltage. When the driving transistor DT is turned on, the anode of the OLED may be coupled to the first power voltage line VDDL. Thus, the OLED may emit light.

The scan transistor ST may be coupled between the gate electrode of the driving transistor DT and the j-th data line Dj. The scan transistor ST includes a gate electrode, a first electrode, and a second electrode. The gate electrode of the scan transistor ST may be coupled to the k-th scan line Sk. The first electrode of the scan transistor ST may be coupled to the j-th data line Dj. The second electrode of the scan transistor ST may be coupled to the gate electrode of the driving transistor DT.

The scan transistor ST may be turned on or turned off according to a scan signal from the k-th scan line Sk. When scan transistor ST is turned on, a data voltage of the j-th data line Dj is supplied to the gate electrode of the driving transistor DT.

The first capacitor C1 is between the gate electrode of the driving transistor DT and the first power voltage line VDDL. The first capacitor C1 stores a difference voltage between a voltage supplied to the gate electrode of the driving transistor DT and the first power voltage.

Semiconductor layers of the driving transistor DT and the scan transistor ST may be formed of Poly-Si using a low temperature Poly-Si (LTPS) process. In other embodiments, the semiconductor layers of the driving transistor DT and scan transistor ST may be formed of either a-Si or an oxide semiconductor, or another suitable semiconductor material Also, the first exemplary embodiment has been described with respect to an example in which the driving transistor DT and scan transistor ST are implemented as P-type transistors. In other embodiments, driving transistor DT and scan transistor ST may be implemented as N-type transistors.

Figure 7:
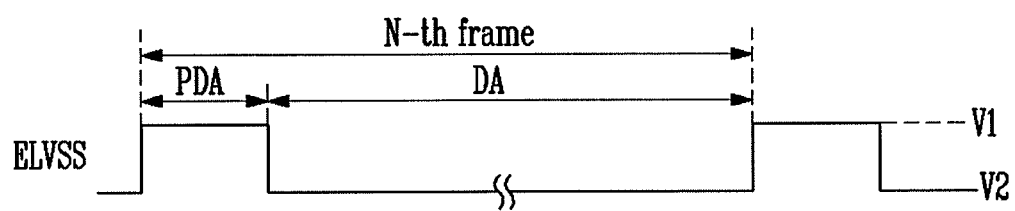
FIG. 7 illustrates a second power voltage supplied to a second power voltage line during a N-th frame period, according to one embodiment.

FIG. 7 is a waveform diagram illustrating a second power voltage supplied to a second power voltage line during a N-th frame period according to one embodiment. The second power voltage supplied to the second power voltage line VSSL during the (N+1)-th frame period may be substantially same as the second power voltage supplied to the second power voltage line VSSL during the N-th frame period.

Referring to FIG. 7, the power supply source 60 may supply the second power voltage having a first level voltage V1 during the data pre-addressing period PDA, and the second power voltage having a second level voltage V2 lower than the first level voltage V1 during the data addressing period DA.

The first and second level voltages V1, V2 may be set based on the first power voltage. For example, a voltage difference between the first power voltage and the first level voltage V1 is less than a threshold voltage of the OLED. Also, a voltage difference between the first power voltage and the second level voltage V2 is greater than the threshold voltage of the OLED.

Therefore, the OLED may not emit light during the data pre-addressing period PDA because the second power voltage having the first level voltage V1 is supplied to the cathode of the OLED. The OLED may emit light during the data addressing period DA because the second power voltage having the second level voltage V2 is supplied to the cathode of the OLED.

Hereinafter, operation of the pixel P according to one embodiment is described in detail with reference to FIGS. 5 to 7. First, the scan transistor ST is turned on in response to a pulse of a first scan signal of the k-th scan line Sk during the data pre-addressing period PDA. Thus, a pre data voltage is supplied to the gate electrode of the driving transistor DT synchronized with the pulse of the first scan signal of the k-th scan line Sk. If the pre data voltage is a first voltage, the driving transistor DT is turned on. If the pre data voltage is a second voltage, the driving transistor DT is turned off.

The second power voltage having first level voltage V1 is supplied to the cathode of the OLED through the second power voltage line VSSL during the data pre-addressing period PDA. Because the voltage difference between the first power voltage and first level voltage V1 is less than a threshold voltage of the OLED, the OLED may not emit light even though the anode of the OLED is coupled to the first power voltage line VDDL by turning on of the driving transistor DT. Therefore, the pixel P may not emit light regardless of the driving transistor DT being turned on during data pre-addressing period PDA.

Second, the scan transistor ST is turned on in response to each pulse of a second scan signal of the k-th scan line Sk during the data addressing period DA. Thus, a data voltage is supplied to the gate electrode of the driving transistor DT synchronized with each pulse of the second scan signal of the k-th scan line Sk. If the data voltage is a first voltage, the driving transistor DT is turned on. If the data voltage is a second voltage, the driving transistor DT is turned off.

The second power voltage having the second level voltage V2 is supplied to the cathode of the OLED through the second power voltage line VSSL during the data addressing period DA. Because the voltage difference between the first power voltage and second level voltage V2 is greater than a threshold voltage of the OLED, the OLED emits light when the anode of the OLED is coupled to the first power voltage line VDDL by turning on the driving transistor DT. Therefore, the pixel P may emit light when the driving transistor DT is turned on.

In conclusion, the pixels P of display panel 10 may not emit light during the data pre-addressing period PDA and may emit light during the data addressing period DA.

Figure 8:
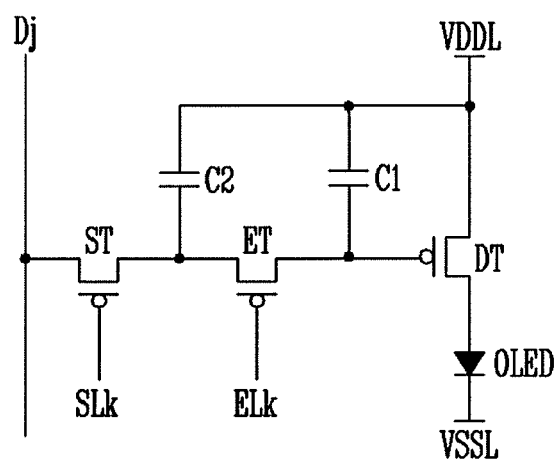
FIG. 8 illustrates another embodiment of a pixel.

FIG. 8 illustrates a second embodiment of a pixel which includes the driving transistor DT, the scan transistor ST, an emission transistor ET, the OLED, and the first and second capacitors C1, C2. The pixel P is coupled to a k-th scan line Sk, a k-th emission line Ek, and a j-th data line Dj. The driving transistor DT, scan transistor ST, OLED, and first capacitor C1 of pixel P may be substantially same as those of pixel P according to the first embodiment in FIG. 6.

The emission transistor ET may be coupled between the gate electrode of the driving transistor DT and the second electrode of the scan transistor ST. The emission transistor ET includes a gate electrode, a first electrode, and a second electrode. The gate electrode of the emission transistor ET may be coupled to the k-th emission line Ek. The first electrode of the emission transistor ET may be coupled to the second electrode of scan transistor ST. The second electrode of emission transistor ET may be coupled to the gate electrode of the driving transistor DT.

The emission transistor ET may be turned on or turned off according to an emission signal from the k-th emission line Ek. When the emission transistor ET is turned on, the gate electrode of the driving transistor DT is coupled to the second electrode of the scan transistor ST. Thus, if the scan transistor ST is turned on, a data voltage may be supplied to the gate electrode of the driving transistor DT.

The second capacitor C2 is formed between the first electrode of the emission transistor ET and the first power voltage line VDDL. The second capacitor C2 stores a difference voltage between a voltage supplied to the first electrode of the emission transistor ET and the first power voltage.

The semiconductor layer of the emission transistor ET may be formed of Poly-Si using a low temperature Poly-Si (LTPS) process. In other embodiments, the semiconductor layer of emission transistor ET may be formed of either a-Si or an oxide semiconductor, or another suitable semiconductor material. Also, the second embodiment has been described with respect to a P-type emission transistor ET. In other embodiments, the emission transistor ET may be an N-type.

Figure 9:
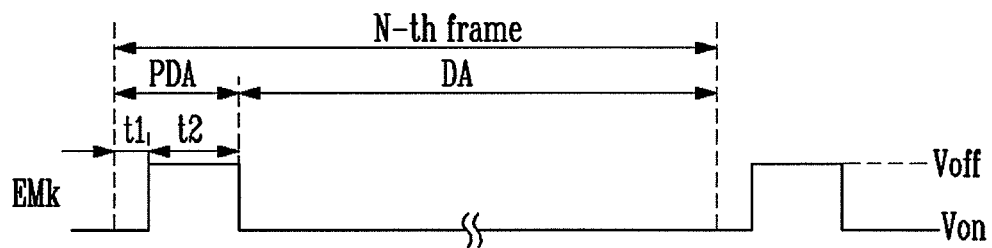
FIG. 9 illustrates a k-th emission signal supplied to an emission line during a N-th frame period, according to one embodiment.

FIG. 9 is a waveform diagram illustrating a k-th emission signal during a N-th frame period according to another embodiment. The k-th emission signal EMk during the (N+1)-th frame period may be the same as the k-th emission signal EMk during the N-th frame period.

Referring to FIG. 9, the data pre-addressing period includes a first period t1 for initializing the gate electrode of the driving transistor DT and a second period t2 for supplying pre data voltages. An emission signal output unit of scan driver 30 may supply an emission signal having a gate on voltage Von during the first period t1 and supply an emission signal having a gate off voltage Voff during the second period t2. The emission signal output unit of the scan driver 30 may supply an emission signal having a gate on voltage Von during the data addressing period DA.

The emission transistor ET may be turned on when the emission signal having a gate on voltage Von is supplied to the gate electrode of the emission transistor ET. The emission transistor ET may be turned off when the emission signal having a gate off voltage Voff is supplied to the gate electrode of the emission transistor ET.

In this case, a scan signal output unit of scan driver 30 may supply the first scan signals having two pulses to scan lines S1 to Sk. More specifically, the scan signal output unit may simultaneously supply the first pulses of the first scan signals to scan lines S1 to Sk. The scan signal output unit may supply the second pulses of the first scan signals to scan lines S1 to Sk according to a sequential order.

Also, the data driver 30 may supply data voltages having the second voltages synchronized with the first pulses of the first signals during the first period t1, and pre data voltages synchronized with the second pulses of the first signals during the second period t2.

Operation of the pixel P according to the present embodiment is described with reference to FIGS. 5, 8 and 9. First, the scan transistor ST is turned on in response to a first pulse of a first scan signal of the k-th scan line Sk during first period t1. The emission transistor ET is turned on in response to the k-th emission signal EMk of the k-th emission line Ek during the first period t1.

Therefore, a data voltage having the second voltage is supplied to the gate electrode of driving transistor DT synchronized with the first pulse of the first scan signal of the k-th scan line Sk during first period t1. That is, the gate electrode of the driving transistor DT is initialized to the data voltage having the second voltage for turning off the driving transistor DT during the first period t1. Accordingly, the OLED may not emit light during the first period t1.

Second, the scan transistor ST is turned on in response to a second pulse of a first scan signal of the k-th scan line Sk during the second period t2. The emission transistor ET is turned off in response to the k-th emission signal EMk of the k-th emission line Ek during the second period t2.

Therefore, a pre data voltage may be stored to the second capacitor C2 during the second period t2. The pre data voltage may not be supplied to the gate electrode of the driving transistor DT during the second period t2. That is, the gate electrode of the driving transistor DT is kept to the data voltage having the second voltage due to the first capacitor C1 during the second period t2. Accordingly, the OLED may not emit light during the second period t2.

Third, the scan transistor ST is turned on in response to each pulse of a second scan signal of the k-th scan line Sk during data addressing period DA. The emission transistor ET is turned on in response to the k-th emission signal EMk of the k-th emission line Ek during the data addressing period DA.

Therefore, a data voltage is supplied to the gate electrode of driving transistor DT synchronized with each pulse of the second scan signal of the k-th scan line Sk. If the data voltage is a first voltage, the driving transistor DT is turned on. If the data voltage is a second voltage, the driving transistor DT is turned off. Accordingly, the OLED may emit light when the anode of the OLED is coupled to the first power voltage line VDDL by turning on the driving transistor DT.

In conclusion, the pixels P of display panel 10 may not emit light during the data pre-addressing period PDA and may emit light during the data addressing period DA.

FIG. 10 illustrates a third embodiment of a pixel P which includes the driving transistor DT, the scan transistor ST, the emission transistor ET, the OLED, and the first capacitor C1. The pixel P is coupled to a k-th scan line Sk, a k-th emission line Ek and a j-th data line Dj. The driving transistor DT, the scan transistor ST, OLED, and the first capacitor C1 of the pixel P may be substantially the same as those of the pixel P according to the first embodiment in FIG. 6.

The emission transistor ET may be coupled between the second electrode of the driving transistor DT and the anode of the organic light emitting diode OLED. The emission transistor ET includes a gate electrode, a first electrode and a second electrode. The gate electrode of the emission transistor ET may be coupled to the k-th emission line Ek. The first electrode of the emission transistor ET may be coupled to the second electrode of the driving transistor DT. The second electrode of emission transistor ET may be coupled to the anode of the organic light emitting diode OLED.

The emission transistor ET may be turned on or turned off according to an emission signal from the k-th emission line Ek. When the emission transistor ET is turned on, the second electrode of the driving transistor DT is coupled to the anode of the OLED. Thus, when the driving transistor DT is turned on, the OLED emits light.

The semiconductor layer of the emission transistor ET may be formed of Poly-Si using a low temperature Poly-Si (LTPS) process. In another embodiment, the semiconductor layer of emission transistor ET may be formed of either a-Si or an oxide semiconductor, or another suitable semiconductor material. Also, emission transistor ET is a P-type transistor. However, in other embodiments, emission transistor ET may be an N-type transistor.

FIG. 11 is a waveform diagram illustrating a k-th emission signal supplied to an emission line during a N-th frame period according to another embodiment. The k-th emission signal EMk during the (N+1)-th frame period is substantially same as the k-th emission signal EMk during the N-th frame period.

Referring to FIG. 11, an emission signal output unit of scan driver 30 may supply an emission signal having a gate off voltage Voff during the data pre-addressing period PDA, and may supply an emission signal having a gate on voltage Von during the data addressing period DA.

The emission transistor ET may be turned on when the emission signal having a gate on voltage Von is supplied to the gate electrode of the emission transistor ET. The emission transistor ET may be turned off when the emission signal having a gate off voltage Voff is supplied to the gate electrode of the emission transistor ET.

A scan signal output unit of the scan driver 30 may supply the first scan signals to the scan lines S1 to Sk during the data pre-addressing period PDA. The scan signal output unit may supply the second scan signals to the scan lines S1 to Sk during the data addressing period DA. Each first scan signal has one pulse, and each second scan signal has a plurality of pulses.

Operation of the pixel P is described with reference to FIGS. 5, 10, and 11. First, the scan transistor ST is turned on in response to a first scan signal of the k-th scan line Sk during the data pre-addressing period PDA. The emission transistor ET is turned off in response to the k-th emission signal EMk of the k-th emission line Ek during the data pre-addressing period PDA.

Therefore, a pre data voltage may be supplied to the gate electrode of the driving transistor DT during the data pre-addressing period PDA. However, the OLED may not emit light during the data pre-addressing period PDA because the emission transistor is turned off.

Second, the scan transistor ST is turned on in response to each pulse of a second scan signal of the k-th scan line Sk during the data addressing period DA. The emission transistor ET is turned on in response to the k-th emission signal EMk of the k-th emission line Ek during the data addressing period DA.

Therefore, a data voltage is supplied to the gate electrode of driving transistor DT synchronized with each pulse of the second scan signal of the k-th scan line Sk. If the data voltage is a first voltage, the driving transistor DT is turned on. If the data voltage is a second voltage, the driving transistor DT is turned off. Accordingly, the OLED may emit light when the anode of the OLED is coupled to the first power voltage line VDDL by turning on the emission transistor ET.

In conclusion, the pixels P of display panel 10 may not emit light during the data pre-addressing period PDA and may emit light during the data addressing period DA.

FIG. 12 illustrates memories of a timing controller 50 according to one embodiment. Referring to FIG. 12, during a N-th frame period, timing controller 50 may read a digital video data supplied during a (N−1)-th frame period from a second memory MEM2, and may write a digital video data supplied during the N-th frame period to a first memory MEM1. Also, during a (N+1)-th frame period, the timing controller 50 may read a digital video data supplied during the N-th frame period from first memory MEM1, and may write a digital video data supplied during the (N+1)-th frame period to second memory MEM2.

Thus, at least one embodiment may address one frame digital video data during one frame period. Therefore, the timing controller 50 may be driven with only two memories MEM1, MEM2. Accordingly, the number of memories may be reduced, thus decreasing manufacturing costs compared with the related art.

By way of summation and review, the shutter glass method for generating a stereoscopic image is susceptible to 3D crosstalk. For example, a user may perceive 3D crosstalk when the user sees the left and right eye images at the same time. In an attempt to prevent 3D crosstalk, a direct-view type display may be driven by separating one frame period into at least two sub frame periods.

For example, the direct-view type display may display left eye images during first and second sub frame periods of N-th (N is a positive integer) frame period, and may display right eye images during first and second sub frame periods of (N+1)-th frame period. In this instance, the direct-view type display may be driven in a high frame frequency, e.g., 240 Hz. Thus, a data voltage supply period in which a data voltage is supplied to a pixel of the direct-view type display may be decreased. As a result, grayscale representation may be lowered.

In accordance with one or more of the aforementioned embodiments, pre data voltages supplied to pixels P of a display panel during the data pre-addressing period PDA are the same as data voltages lastly supplied to pixels of the display panel during the data addressing period DA of the previous frame period. Also, the data pre-addressing period PDA may be shorter than the data addressing period DA.

As a result, one or more embodiments described herein may increase a data voltage supply period of a data voltage supply period in which a data voltage is supplied to a pixel P. Therefore, the embodiments may prevent 3D crosstalk and also increase grayscale representation.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A stereoscopic image display device, comprising:
a display panel including a plurality of pixels coupled to data lines and scan lines, wherein the pixels are not to emit light during a data pre-addressing period and the pixels are to emit light during a data addressing period;
a scan driver to supply scan signals to the scan lines; and
a data driver to supply data voltages to the data lines in synchronization with the scan signals, wherein the scan driver is to supply first scan signals of the scan signals to the scan lines during the data pre-addressing period, and is to supply second scan signals of the scan signals to the scan lines during the data addressing period, and wherein each of the first scan signals has one pulse and each of the second scan signals has a plurality of pulses,
wherein the scan driver is to supply pulses of the first scan signals to the scan lines according to a non-sequential order during the data pre-addressing period, wherein at least one pixel of the plurality of pixels includes:
a driving transistor to turn on or off according to a voltage supplied to a gate electrode of the driving transistor;
a scan transistor to turn on to supply a data voltage to the gate electrode of the driving transistor in response to scan pulses of the scan signals;
an organic light emitting diode to emit light when the driving transistor is turned on; and
a first capacitor coupled between the gate electrode of the driving transistor and a first power voltage line to which a first power voltage is supplied, and wherein:
a second power voltage is to be supplied to a second power voltage line coupled to a cathode of the organic light emitting diode,
the second power voltage has a first level voltage during the data pre-addressing period and a second level voltage lower than the first level voltage, during the data addressing period.

2. The display device as claimed in claim 1, wherein data voltages to be supplied to the plurality of pixels during the data pre-addressing period are same values as data voltages to be lastly supplied to the plurality of pixels during the data addressing period.

3. The display device as claimed in claim 1, wherein the scan driver is to supply pulses of the second scan signals to the scan lines according to a non-sequential order during the data addressing period.

4. The display device as claimed in claim 1, wherein:
the driving transistor is to turn on when a first data voltage is supplied to the gate electrode of the driving transistor, and
the driving transistor is to turn off when a second data voltage, lower than the first data voltage, is supplied to the gate electrode of the driving transistor.

5. The display device as claimed in claim 1, wherein:
the display panel includes emission lines parallel to scan lines,
the at least one pixel includes an emission transistor to turn on to connect the gate electrode of the driving transistor with the scan transistor in response to one or more emission signals supplied to the emission lines.

6. The display device as claimed in claim 5, wherein:
the emission signal is to be supplied as a gate on voltage during a first period of the data pre-addressing period and the data addressing period and to be supplied a gate off voltage during a second period of the data pre-addressing period,
the emission transistor is to be turned on when the emission signal having the gate on voltage is supplied and turned off when the emission signal having the gate off voltage is supplied.

7. The display device as claimed in claim 1, wherein:
the display panel includes emission lines parallel to scan lines,
the at least one pixel includes an emission transistor to turn on to connect the driving transistor with the organic light emitting diode in response to one or more emission signals supplied to the emission lines.

8. The display device as claimed in claim 7, wherein:
the emission signal is to be supplied as a gate on voltage during the data addressing period and a gate off voltage during the data pre-addressing period, and the emission transistor is to be turned on when the emission signal having the gate on voltage is supplied and turned off when the emission signal having the gate off voltage is supplied.

9. A stereoscopic image display device, comprising:
a display panel including a plurality of pixels coupled to data lines and scan lines, wherein the pixels are not to emit light during a data pre-addressing period and the pixels are to emit light during a data addressing period;
a scan driver to supply scan signals to the scan lines; and
a data driver to supply data voltages to the data lines in synchronization with the scan signals, wherein the scan driver is to supply first scan signals of the scan signals to the scan lines during the data pre-addressing period, and is to supply second scan signals of the scan signals to the scan lines during the data addressing period, and wherein each of the first scan signals has one pulse and each of the second scan signals has a plurality of pulses, wherein the scan driver is to supply pulses of the first scan signals to the scan lines according to a sequential order during the data pre-addressing period, wherein at least one pixel of the plurality of pixels includes:
a driving transistor to turn on or turn off according to a voltage supplied to a gate electrode of the driving transistor;
a scan transistor to turn on to supply a data voltage to the gate electrode of the driving transistor in response to the scan signals;
an organic light emitting diode to emit light in accordance with the drain-source current of the driving transistor; and
a storage capacitor coupled between the gate electrode of the driving transistor and a first power voltage line to which a first power voltage is supplied, and wherein:
a second power voltage is to be supplied to a second power voltage line coupled to a cathode of the organic light emitting diode, and
the second power voltage has a first level voltage during the data pre-addressing period and a second level voltage lower than the first level voltage during the data addressing period.

10. The display device as claimed in claim 9, wherein the driving transistor is to turn on when a first data voltage is supplied to the gate electrode of the driving transistor and to turn off when a second data voltage lower than the first data voltage is supplied to the gate electrode of the driving transistor.

11. The display device as claimed in claim 9, wherein:
the display panel includes emission lines parallel to scan lines,
the at least one pixel includes an emission transistor to turn on to connect the gate electrode of the driving transistor with the scan transistor in response to emission signals supplied to the emission lines.

12. The display device as claimed in claim 11, wherein:
the emission signal is to be supplied as a gate on voltage during a first period of the data pre-addressing period and the data addressing period and is to be supplied as a gate off voltage during a second period of the data pre-addressing period, and
the emission transistor is to turn on when the emission signal having the gate on voltage is supplied and is to turn off when the emission signal having the gate off voltage is supplied.

13. The display device as claimed in claim 9, wherein:
the display panel includes emission lines parallel to scan lines,
the at least one pixel includes an emission transistor to turn on to connect the driving transistor with the organic light emitting diode in response to one or more emission signals supplied to the emission lines.

14. The display device as claimed in claim 13, wherein:
the emission signal is to be supplied as a gate on voltage during the data addressing period and a gate off voltage during the data pre-addressing period,
the emission transistor is to turn on when the emission signal having the gate on voltage is supplied and is to turn off when the emission signal having the gate off voltage is supplied.

* * * * *